US009106079B2

United States Patent
Fukaya

(10) Patent No.: US 9,106,079 B2
(45) Date of Patent: Aug. 11, 2015

(54) POWER SUPPLY APPARATUS, METHOD, AND RECORDING MEDIUM

(75) Inventor: Yudai Fukaya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 797 days.

(21) Appl. No.: 13/437,608

(22) Filed: Apr. 2, 2012

(65) Prior Publication Data

US 2012/0256495 A1 Oct. 11, 2012

(30) Foreign Application Priority Data

Apr. 7, 2011 (JP) .................................. 2011-085803

(51) Int. Cl.
*H01F 38/00* (2006.01)
*H02J 7/00* (2006.01)
*H02J 7/02* (2006.01)
*H02J 17/00* (2006.01)

(52) U.S. Cl.
CPC .............. *H02J 7/0004* (2013.01); *H02J 7/025* (2013.01); *H02J 17/00* (2013.01)

(58) Field of Classification Search
USPC ........................................................ 307/104
See application file for complete search history.

(56) References Cited

FOREIGN PATENT DOCUMENTS

| CN | 101621220 A | 1/2010 |
|---|---|---|
| CN | 101656436 A | 2/2010 |
| CN | 101682216 A | 3/2010 |
| JP | 2001-275266 A | 10/2001 |
| JP | 2003264934 A | 9/2003 |
| JP | 2008234882 A | 10/2008 |
| JP | 2009267633 A | 11/2009 |
| JP | 2010028934 A | 2/2010 |
| JP | 2010148190 A | 7/2010 |
| JP | 2010213414 A | 9/2010 |
| JP | 2011030404 A | 2/2011 |
| WO | 98/50993 A1 | 11/1998 |

*Primary Examiner* — Rexford Barnie
*Assistant Examiner* — Dru Parries
(74) *Attorney, Agent, or Firm* — Canon U.S.A. Inc., IP Division

(57) ABSTRACT

A power supply apparatus includes a power supply unit that wirelessly supplies power to an electronic apparatus, and a control unit that controls, if power output from the power supply unit to the electronic apparatus is lower than a first predetermined value, the communication unit so that a predetermined speed for transmitting the predetermined data is higher than a second predetermined value.

10 Claims, 7 Drawing Sheets

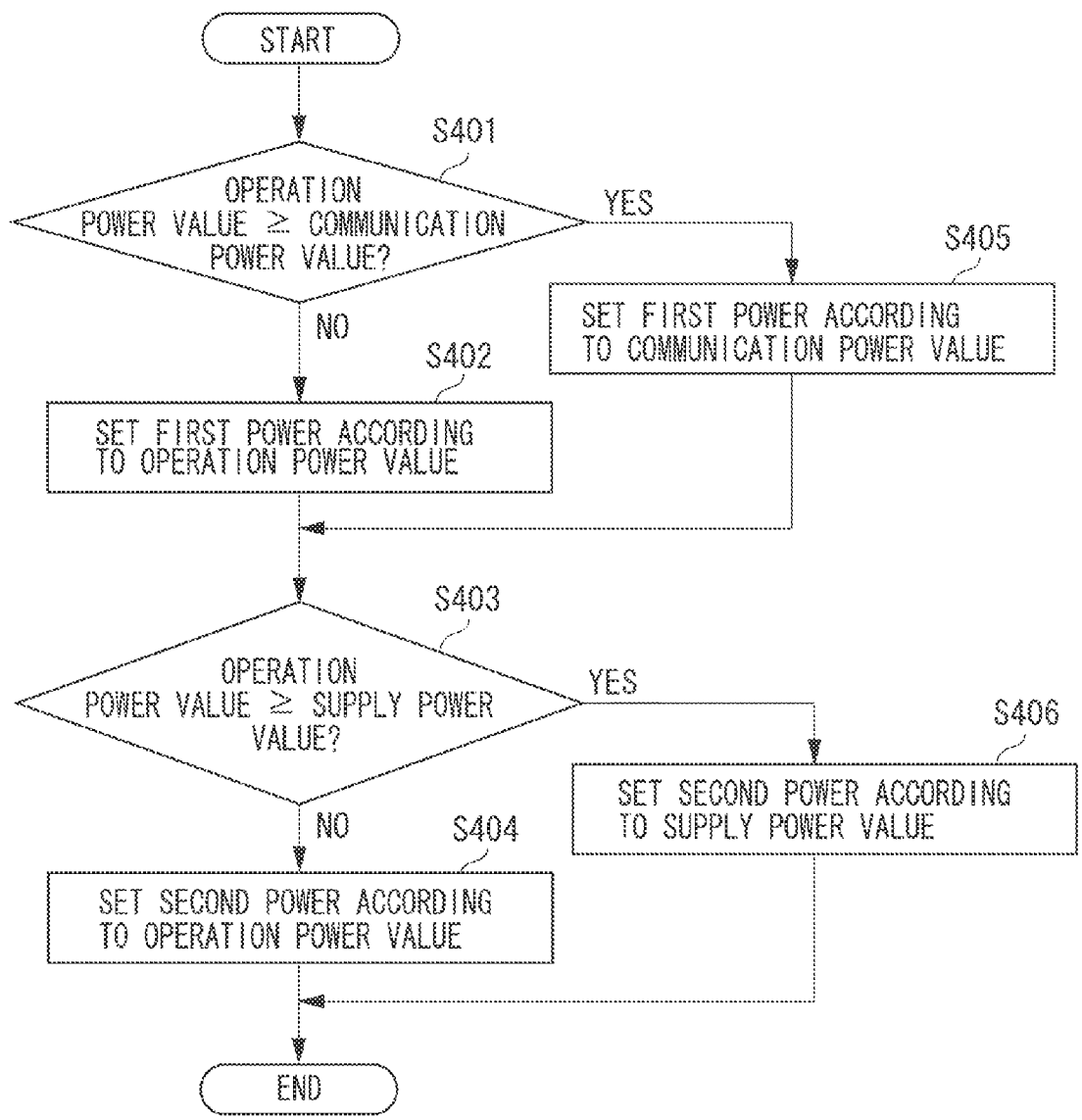

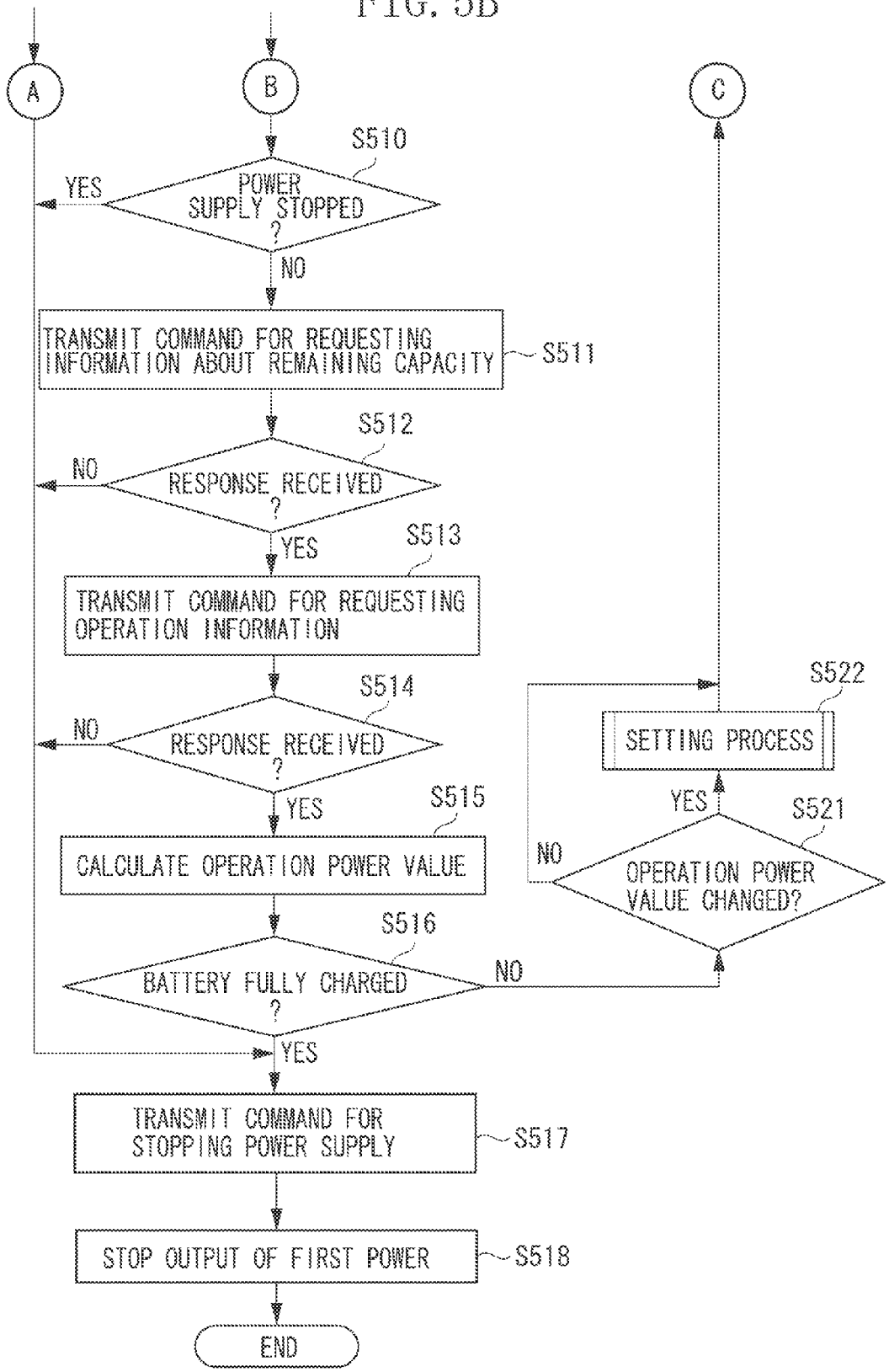

POWER SUPPLY APPARATUS, METHOD, AND RECORDING MEDIUM

BACKGROUND OF THE INVENTION

1. Field of the Invention

The present invention relates to a power supply apparatus for wirelessly supplying power to an electronic apparatus, a method therefor, and a recording medium.

2. Description of the Related Art

In recent years, there has been known a power supply system including a power supply apparatus with a primary coil for wirelessly outputting power without being connected by a connector and an electronic apparatus with a secondary coil for wirelessly receiving the power supplied by the power supply apparatus.

Japanese Patent Application Laid-Open No. 2001-275266 discusses such a power supply system in which a power supply apparatus supplies power to an electronic apparatus via a primary coil and transmits predetermined data to the electronic apparatus via the primary coil.

Until recently, when the power supply apparatus supplies power to an electronic apparatus, the power supply apparatus has controlled the supply of power to the electronic apparatus by transmitting data for controlling the electronic apparatus to the electronic apparatus via the primary coil and causing the electronic apparatus to perform a process according to the data received from the power supply apparatus.

However, communication with the electronic apparatus is affected depending on power output by the power supply apparatus via the primary coil, and the electronic apparatus may be precluded from receiving data transmitted from the power supply apparatus. In such a case, the electronic apparatus does not perform a process according to data received from the power supply apparatus, and thus an issue may arise that the power supply apparatus cannot control the supply of power to the electronic apparatus.

The power supply apparatus needs to correctly communicate data according to power supplied to the electronic apparatus when the power supply apparatus supplies power to the electronic apparatus in order to prevent such an issue.

SUMMARY OF THE INVENTION

One aspect of the present invention relates to a technique that enables performing a process for transmitting data to an electronic apparatus while supplying power to the electronic apparatus.

According to an aspect of the present invention, a power supply apparatus includes a power supply unit that wirelessly supplies power to an electronic apparatus, a communication unit that transmits predetermined data to the electronic apparatus, and a control unit that controls, if power output from the power supply unit to the electronic apparatus is lower than a first predetermined value, the communication unit so that a predetermined speed for transmitting the predetermined data is higher than a second predetermined value.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a flow chart illustrating an example of a setting process performed by the power supply apparatus according to the first exemplary embodiment.

DESCRIPTION OF THE EMBODIMENTS

Various exemplary embodiments, features, and aspects of the invention will be described in detail below with reference to the drawings.

Figure 1:
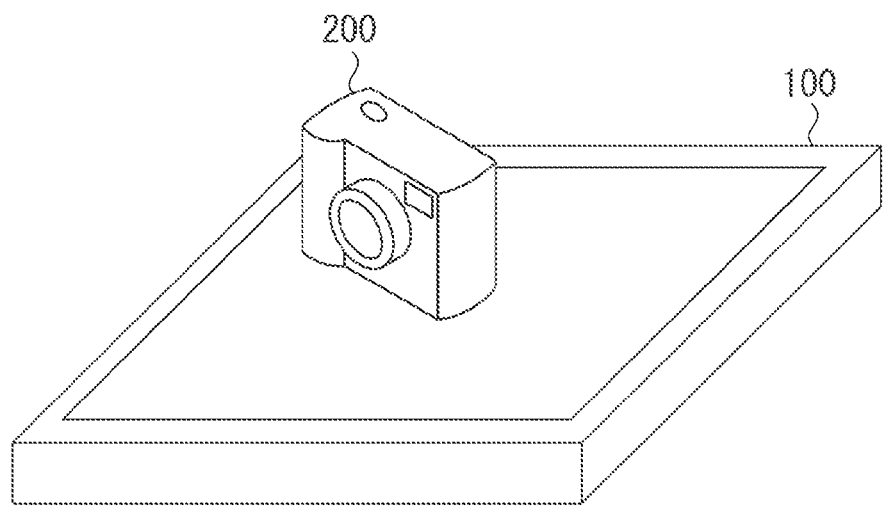
FIG. 1 is a schematic diagram illustrating an example of a power supply system according to a first exemplary embodiment of the present invention.

A first exemplary embodiment of the present invention is described in detail below with reference to the drawings. As illustrated in FIG. 1, a power supply system according to the first exemplary embodiment includes a power supply apparatus 100 and an electronic apparatus 200. In the power supply system according to the first exemplary embodiment, as illustrated in FIG. 1, when the electronic apparatus 200 is placed on the power supply apparatus 100, the power supply apparatus 100 wirelessly supplies power to the electronic apparatus 200 via a power supply antenna 108. If a distance between the power supply apparatus 100 and the electronic apparatus 200 is within a predetermined range, the electronic apparatus 200 by using a power receiving antenna 201 wirelessly receives the power output from the power supply apparatus 100 via the power receiving antenna 201.

The electronic apparatus 200 charges a battery 210 attached to the electronic apparatus 200 by the power received from the power supply apparatus 100 via the power receiving antenna 201. If the distance between the power supply apparatus 100 and the electronic apparatus 200 is out of the predetermined range, the electronic apparatus 200 cannot receive the power from the power supply apparatus 100 even though the electronic apparatus 200 includes the power receiving antenna 201.

The predetermined range refers to a range within which the electronic apparatus 200 can communicate with the power supply apparatus 100 using the power supplied from the power supply apparatus 100.

It is assumed that the power supply apparatus 100 can wirelessly supply power to a plurality of electronic apparatuses.

The electronic apparatus 200 may be an imaging apparatus such as a digital still camera, a cellular phone with a camera, and a digital video camera as long as it is an electronic apparatus operated by power supplied by the battery 210. The electronic apparatus 200 may also be a reproducing apparatus such as a player for reproducing audio data and video data.

Further, the electronic apparatus 200 may be a moving apparatus such as an automobile driven by power supplied by the battery 210.

Furthermore, the electronic apparatus 200 may be an electronic apparatus that can be operated by power supplied from the power supply apparatus 100 even if the battery 210 is not attached to the electronic apparatus 200.

Figure 2:
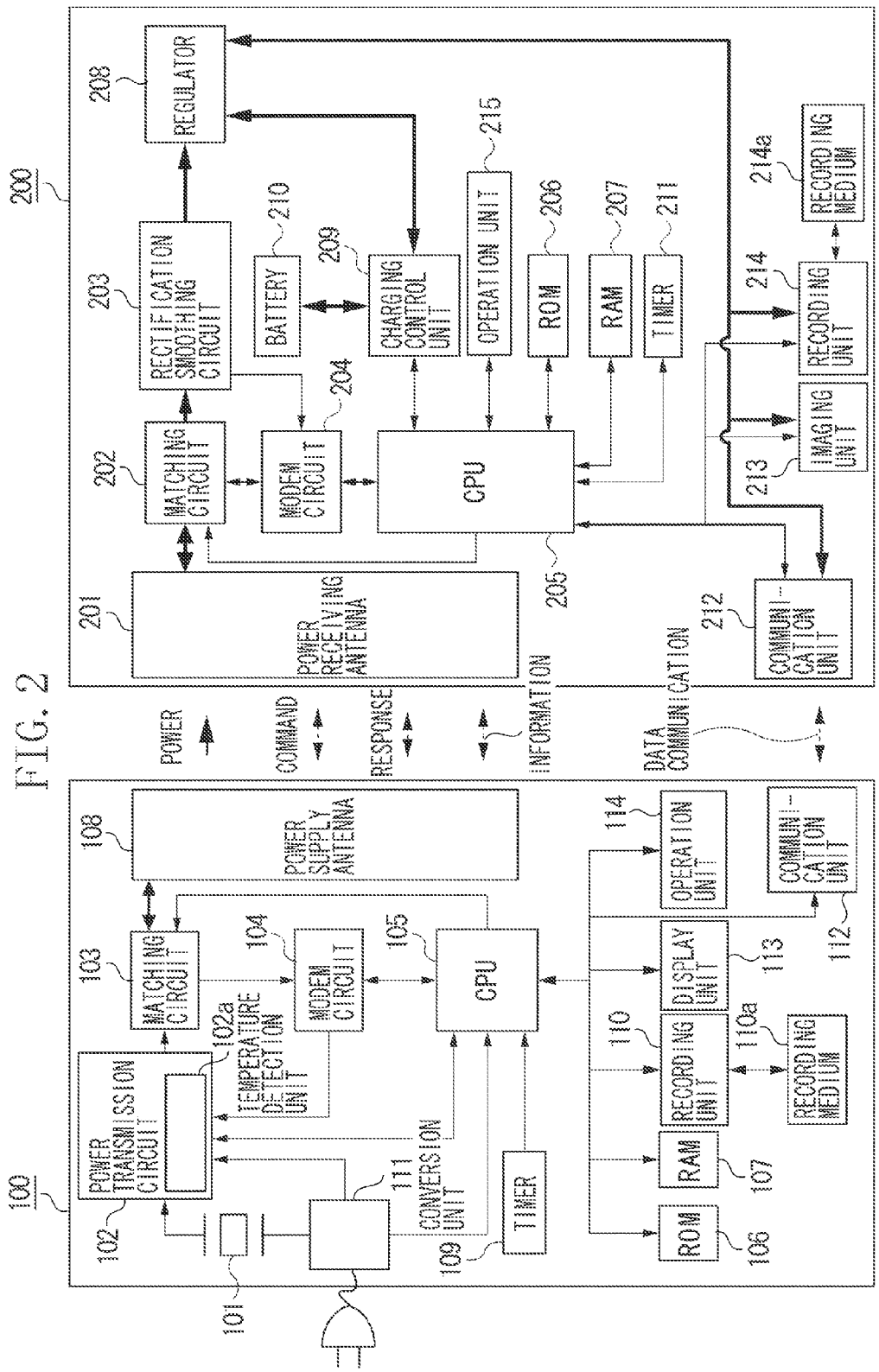
FIG. 2 is a block diagram illustrating an example of the power supply system according to the first exemplary embodiment.

FIG. 2 is a block diagram of the power supply system including the power supply apparatus 100 and the electronic apparatus 200.

As illustrated in FIG. 2, the power supply apparatus 100 includes an oscillator 101, a power transmission circuit 102, a matching circuit 103, a modulation and demodulation (modem) circuit 104, a central processing unit (CPU) 105, a read only memory (ROM) 106, a random access memory (RAM) 107, a power supply antenna 108, a timer 109, a recording unit 110, and a conversion unit 111. The power supply apparatus 100 further includes a communication unit 112, a display unit 113, and an operation unit 114 as illustrated in FIG. 2. The modulation and demodulation circuit 104 is referred to as "modem circuit 104".

The oscillator 101 oscillates a high frequency used for supplying power to the electronic apparatus 200 by converting the power supplied from an alternating current (AC) power source (not illustrated) via the conversion unit 111 to power corresponding to a target value set by the CPU 105. The oscillator 101 uses a quartz resonator or the like.

The power transmission circuit 102 generates power to be supplied to the electronic apparatus 200 via the power supply antenna 108 according to the power supplied from the conversion unit 111 and the frequency oscillated by the oscillator 101. The power transmission circuit 102 includes a field effect transistor (FET) therein and controls current flowing between the source and drain terminals of the FET according to the frequency oscillated by the oscillator 101 to generate power supplied to the electronic apparatus 200. The power generated by the power transmission circuit 102 is supplied to the power supply antenna 108 via the matching circuit 103.

The power generated by the power transmission circuit 102 includes a first power and a second power.

The first power is the one to transmit a command for the power supply apparatus 100 controlling the electronic apparatus 200 to the electronic apparatus 200. The second power is larger than the first power. For example, the first power is 2 watts or smaller, and the second power is 3 watts to 10 watts.

If the power supply apparatus 100 supplies the first power to the electronic apparatus 200, the power supply apparatus 100 can transmit the command to the electronic apparatus 200. If the power supply apparatus 100 supplies the second power to the electronic apparatus 200, however, the power supply apparatus 100 cannot transmit the command to the electronic apparatus 200.

The first power is the one set by the CPU 105 so that the power supply apparatus 100 can transmit the command to any apparatus excluding the electronic apparatus 200.

The CPU 105 controls the power transmission circuit 102 to switch the power supplied to the electronic apparatus 200 to any one of the first and the second power.

The power transmission circuit 102 includes a temperature detection unit 102a. The temperature detection unit 102a detects temperature information indicating the temperature of the power supply apparatus 100 and regularly provides the temperature information to the CPU 105.

The matching circuit 103 is a resonant circuit which resonates between the power supply antenna 108 and a power receiving antenna included in an apparatus which is selected by the CPU 105 as a target to which power is supplied according to the frequency oscillated by the oscillator 101.

The matching circuit 103 includes elements such as a variable capacitor, a variable coil, and a resistor, which are not illustrated. The matching circuit 103 matches the impedance between the power transmission circuit 102 and the power supply antenna 108 according to these elements.

The CPU 105 controls the values of the variable capacitor and the variable coil, which are not illustrated, to set the frequency oscillated by the oscillator 101 to a resonance frequency f. The resonance frequency f is the one at which the power supply apparatus 100 resonates with a target apparatus to which the power supply apparatus 100 supplies power.

The frequency at which the power supply apparatus 100 resonates with the target apparatus to which the power supply apparatus 100 supplies power is referred to as "resonance frequency f."

The following expression (1) indicates a resonance frequency f. Where, L is the inductance of the matching circuit 103, and C is the capacitance of the matching circuit 103.

[Expression 1]

$$f = \frac{1}{2\pi\sqrt{LC}} \quad (1)$$

The matching circuit 103 may further include a capacitor, a coil, and a resistor in addition to the variable capacitor, the variable coil, and the resistor, which are not illustrated.

The CPU 105 controls the values of the variable capacitor and the variable coil, which are not illustrated, to set the frequency oscillated by the oscillator 101 to the resonance frequency f. However, the frequency oscillated by the oscillator 101 may be set to the resonance frequency f by another method.

For example, the frequency oscillated by the oscillator 101 may be set to the resonance frequency f by switching the connection between the capacitor and the coil which are included in the matching circuit 103.

The resonance frequency f may be 50/60 Hz of a commercial frequency, ten to several hundred kHz, or approximately 10 MHz.

The matching circuit 103 may also detect a change in current flowing to the power supply antenna 108 and voltage supplied to the power supply antenna 108.

The power generated by the power transmission circuit 102 is supplied to the power supply antenna 108 via the matching circuit 103 in a state in which the frequency oscillated by the oscillator 101 is set to the resonance frequency f.

The modem circuit 104 modulates the power generated by the power transmission circuit 102 according to a predetermined protocol to transmit a command for controlling the electronic apparatus 200 to the electronic apparatus 200. The predetermined protocol refers to a communication protocol conforming to the international standard organization (ISO)/international electrotechnical commission (IEC) 18092 standard such as radio frequency identification (RFID), for example.

The power generated by the power transmission circuit 102 is converted to a pulse signal as a command for communicating with the electronic apparatus 200 by the modem circuit 104, and the pulse signal is transmitted to the electronic apparatus 200 via the power supply antenna 108. The predetermined protocol may be a communication protocol compatible with a near field communication (NFC) standard.

The pulse signal transmitted to the electronic apparatus 200 is analyzed by the electronic apparatus 200 to be detected as bit data including information of "1" and "0." The command includes identification information for identifying a destination and a command code indicating an operation instructed by the command.

The CPU 105 can transmit the command only to the electronic apparatus 200 by controlling the modem circuit 104 so as to change the identification information included in the command. Further, the CPU 105 can also transmit the command to the electronic apparatus 200 and an apparatus other than the electronic apparatus 200 by controlling the modem circuit 104 so as to change the identification information included in the command.

The modem circuit 104 converts the power generated by the power transmission circuit 102 to a pulse signal by amplitude shift keying (ASK) modulation using amplitude displacement. The ASK modulation is the one that uses amplitude displacement and is used for communication between an integrated circuit (IC) card and a card reader for wirelessly communicating with an IC card.

The modem circuit 104 switches an analog multiplier and a load resistor included in the modem circuit 104 to change the amplitude of the power generated by the power transmission circuit 102. Accordingly, the modem circuit 104 converts the amplitude of the power generated by the power transmission circuit 102 to the pulse signal. The pulse signal to which the modem circuit 104 converts the amplitude of the power is supplied to the power supply antenna 108 and transmitted as a command to the electronic apparatus 200.

The modem circuit 104 further includes an encoding circuit based on a predetermined encoding method.

The modem circuit 104 can demodulate a response from the electronic apparatus 200 to the command transmitted to the electronic apparatus 200 by the encoding circuit according to a change in current flowing to the power supply antenna 108 detected by the matching circuit 103. Accordingly, the modem circuit 104 can receive the response from the electronic apparatus 200 to the command transmitted to the electronic apparatus 200 by a load modulation method. The modem circuit 104 transmits the command to the electronic apparatus 200 according to an instruction from the CPU 105. When the modem circuit 104 receives the response from the electronic apparatus 200, the modem circuit 104 demodulates the received response and supplied to the CPU 105.

If the AC power source (not illustrated) is connected with the power supply apparatus 100, the CPU 105 controls the power supply apparatus 100 by the power supplied from the AC power source (not illustrated) via the conversion unit 111. The CPU 105 executes a computer program stored in the ROM 106 to control the operation of the power supply apparatus 100. The CPU 105 controls the power transmission circuit 102 to control the power supplied to the electronic apparatus 200. The CPU 105 further controls the modem circuit 104 to transmit the command to the electronic apparatus 200.

The CPU 105 determines whether an error occurs in the power supply apparatus 100. For example, the CPU 105 determines whether the temperature of the power supply apparatus 100 is equal to or higher than a predetermined temperature based on the temperature information provided by the temperature detection unit 102a. Accordingly, the CPU 105 can determine whether an error occurs in the power supply apparatus 100. If the CPU 105 determines that the temperature of the power supply apparatus 100 is equal to or higher than the predetermined temperature, the CPU 105 determines that an error occurs in the power supply apparatus 100. Whereas if the CPU 105 determines that the temperature of the power supply apparatus 100 is below the predetermined temperature, the CPU 105 determines that an error does not occur in the power supply apparatus 100.

The ROM 106 stores computer programs for controlling the operation of the power supply apparatus 100 and information such as parameters related to the operation of the power supply apparatus 100. The ROM 106 stores video data to be displayed on the display unit 113.

The RAM 107 is a rewritable nonvolatile memory and temporarily records computer programs for controlling the operation of the power supply apparatus 100, information such as parameters related to the operation of the power supply apparatus 100, and information received by the modem circuit 104 from the electronic apparatus 200.

The power supply antenna 108 is the one that outputs the power generated by the power transmission circuit 102 to the outside.

The power supply apparatus 100 supplies power and transmits a command to the electronic apparatus 200 via the power supply antenna 108. The power supply apparatus 100 receives a command from the electronic apparatus 200, a response corresponding to the command transmitted to the electronic apparatus 200, and information transmitted from the electronic apparatus 200 via the power supply antenna 108.

The timer 109 measures the current time and time related to operation and process performed by the power supply apparatus 100. A threshold to time measured by the timer 109 is previously recorded in the ROM 106.

The recording unit 110 records data pieces such as video data and audio data received by the communication unit 112 in a recording medium 110a.

The recording unit 110 can read data pieces such as the video data and the audio data from the recording medium 110a and supply the data to the RAM 107, the communication unit 112, and the display unit 113.

The recording medium 110a may be a hard disk or a memory card, may be incorporated in the power supply apparatus 100, or may be an external recording medium which can be detached from or attached to the power supply apparatus 100.

If the AC power source (not illustrated) is connected with the power supply apparatus 100, the conversion unit 111 converts AC power supplied from the AC power source (not illustrated) to direct current (DC) power and supplies the converted DC power to the entire power supply apparatus 100.

The communication unit 112 transmits the video data and the audio data supplied from any one of the RAM 107 and the recording medium 110a to the electronic apparatus 200. The communication unit 112 receives the video data and the audio data transmitted from the electronic apparatus 200 to the power supply apparatus 100.

For example, the communication unit 112 may perform communication according to an interface such as a universal serial bus (USB) and a high-definition multimedia interface (HDMI) (registered trademark). The communication unit 112 may perform communication in conformity with the wireless communication system. For example, the communication unit 112 may perform wireless communication according to 802.11a, 802.11b, 802.11g, and 802.11n standards regulated in wireless local area network (LAN) standards. The communication unit 112 may transmit and receive video data and audio data modulated to the signals in conformity with the wireless LAN standards.

Even if the modem circuit 104 transmits commands to the electronic apparatus 200 via the power supply antenna 108, the communication unit 112 may receive video data and audio data from the electronic apparatus 200 and transmit video data and audio data to the electronic apparatus 200. Further, even if the modem circuit 104 receives a response corresponding to a command from the electronic apparatus 200 via the power supply antenna 108, the communication unit 112 may receive video data and audio data from the electronic apparatus 200 and transmit video data and audio data to the electronic apparatus 200.

The display unit 113 displays any one of video data read by the recording unit 110 from the recording medium 110a, video data supplied from the RAM 107, video data supplied from the ROME 106, and video data supplied from the communication unit 112. The display unit 113 can also display video data read from the recording medium 110a, an icon and a menu screen previously recorded in the ROM 106.

The operation unit 114 provides a user interface for operating the power supply apparatus 100. The operation unit 114 includes a power source button for operating the power supply apparatus 100, a mode switching button for switching the operation modes of the power supply apparatus 100, and a setting change button for changing settings of the power supply apparatus 100. Each button is formed of a switch and a touch panel. The CPU 105 controls the power supply apparatus 100 according to user's instruction input via the operation unit 114. The operation unit 114 may control the power supply apparatus 100 according to a remote control signal received from a remote controller (not illustrated).

The power supply apparatus 100 may include a speaker unit (not illustrated). The speaker unit (not illustrated) outputs any one of audio data read by the recording unit 110 from the recording medium 110a, audio data supplied from the ROM 106, audio data supplied from the RAM 107, and audio data supplied from the communication unit 112.

When the power supply apparatus 100 supplies power to the electronic apparatus 200 via the power supply antenna 108, any one of the first power and the second power is output to the electronic apparatus 200 by the power transmission circuit 102, the matching circuit 103, the modem circuit 104, and the power supply antenna 108.

When the power supply apparatus 100 transmits a command to the electronic apparatus 200 via the power supply antenna 108, the first power and the command are supplied to the electronic apparatus 200 by the power transmission circuit 102, the matching circuit 103, the modem circuit 104, and the power supply antenna 108.

When the power supply apparatus 100 transmits any one of the video data and the audio data to the electronic apparatus 200, anyone of the video data and the audio data is transmitted by the communication unit 112 to the electronic apparatus 200.

When the power supply apparatus 100 receives any one of the video data and the audio data from the electronic apparatus 200, any one of the video data and the audio data is received by the communication unit 112 from the electronic apparatus 200.

Even when the communication unit 112 transmits any one of the video data and the audio data to the electronic apparatus 200, the power supply apparatus 100 can transmit the command and information to the electronic apparatus 200 via the power supply antenna 108. Even when the communication unit 112 transmits any one of the video data and the audio data to the electronic apparatus 200, the power supply apparatus 100 can receive a response corresponding to the command and information from the electronic apparatus 200 via the power supply antenna 108.

Even when the communication unit 112 receives any one of the video data and the audio data from the electronic apparatus 200, the power supply apparatus 100 can transmit the command and information to the electronic apparatus 200 via the power supply antenna 108. Even when the communication unit 112 receives any one of the video data and the audio data from the electronic apparatus 200, the power supply apparatus 100 can receive a response corresponding to the command and information from the electronic apparatus 200 via the power supply antenna 108.

The power supply apparatus 100 has a plurality of operation modes including high and low speed communication modes. The high speed communication mode is a mode in which a communication speed for transmitting the command and information is set faster than a predetermined speed when the power supply apparatus 100 transmits the command and information to the electronic apparatus 200 or other electronic apparatuses via the power supply antenna 108. Hereinafter, the communication speed at which the command and information are transmitted to the electronic apparatus 200 or other electronic apparatuses is referred to as "communication speed." The low speed communication mode is a mode in which the communication speed is set slower than the predetermined speed when the power supply apparatus 100 transmits the command and information to the electronic apparatus 200 or other electronic apparatuses.

If the operation mode of the power supply apparatus 100 is in the high speed communication mode, the CPU 105 controls the modem circuit 104 to make the communication speed faster than the predetermined speed.

If the operation mode of the power supply apparatus 100 is in the low speed communication mode, the CPU 105 controls the modem circuit 104 to make the communication speed slower than the predetermined speed.

An example of a configuration of the electronic apparatus 200 is described below with reference to FIG. 2.

A digital still camera is taken as an example of the electronic apparatus 200 and the configuration thereof is described below.

The electronic apparatus 200 includes a power receiving antenna 201, a matching circuit 202, a rectification and smoothing circuit 203, a modem circuit 204, a CPU 205, a ROM 206, a RAM 207, a regulator 208, a charging control unit 209, a battery 210, and a timer 211. The electronic apparatus 200 further includes a communication unit 212, an imaging unit 213, a recording unit 214, and an operation unit 215.

The power receiving antenna 201 receives the power supplied from the power supply apparatus 100. The electronic apparatus 200 receives power or a command from the power supply apparatus 100 via the power receiving antenna 201. The electronic apparatus 200 transmits a command for controlling the power supply apparatus 100 and a response corresponding to the command received from the power supply apparatus 100 via the power receiving antenna 201.

The matching circuit 202 matches the impedance between the power receiving antenna 201 and the rectification and smoothing circuit 203 and is a resonant circuit in which the power receiving antenna 201 resonates at the same frequency as the resonance frequency f of the power supply apparatus 100. As is the case with the matching circuit 103, the matching circuit 202 includes a capacitor, a coil, a variable capacitor, a variable coil, and a resistor, which are not illustrated. The matching circuit 202 controls a capacitance value of the variable capacitor, an inductance value of the variable coil, and an impedance value of the resistor so that the power receiving antenna 201 resonates at the same frequency as the resonance frequency f of the power supply apparatus 100.

The matching circuit 202 supplies power received by the power receiving antenna 201 to the rectification and smoothing circuit 203.

The rectification and smoothing circuit 203 removes a command and a noise from the power received by the power receiving antenna 201 to generate DC power. Further, the rectification and smoothing circuit 203 supplies the generated DC power to the regulator 208. The rectification and smoothing circuit 203 supplies the command removed from the power received by the power receiving antenna 201 to the modem circuit 204. The rectification and smoothing circuit 203 includes a diode for rectification and generates DC power by any one of full wave rectification and half wave rectification.

The modem circuit 204 analyzes the command supplied from the rectification and smoothing circuit 203 according to the communication protocol previously determined by the power supply apparatus 100 and supplies the result of analyzing the command to the CPU 205.

If the power supply apparatus 100 supplies power to the electronic apparatus 200, the CPU 205 controls the modem circuit 204 so as to vary a load included in the modem circuit 204 to transmit a command, a response to the command, and a predetermined information to the power supply apparatus 100. If the load included in the modem circuit 204 is changed, the current flowing to the power supply antenna 108 changes. Accordingly, the power supply apparatus 100 detects a change in the current flowing to the power supply antenna 108 and receives the command, the response to the command, and the predetermined information transmitted from the electronic apparatus 200.

The CPU 205 determines which command has received by the modem circuit 204 based on the analysis result supplied from the modem circuit 204 and controls the electronic apparatus 200 so as to perform a process and an operation specified by a command code corresponding to the received command.

The CPU 205 executes a computer program stored in the ROM 206 to control the operation of the electronic apparatus 200. The CPU 205 can detect information indicating power required for the operation and process performed in the electronic apparatus 200. Hereinafter, the information indicating power required for the operation and process performed in the electronic apparatus 200 is referred to as "operation information."

The CPU 205 determines which the operation mode of the electronic apparatus 200 is in and detects the operation information corresponding to the operation mode of the electronic apparatus 200.

Further, the CPU 205 may determine where in the electronic apparatus 200 the regulator 208 supplies power, and detect the operation information corresponding to the place to which the regulator 208 supplies power.

If the operation mode of the electronic apparatus 200 is a charging mode, the operation information includes information indicating power for charging the battery 210. If the operation mode of the electronic apparatus 200 is a shooting mode, the operation information includes information indicating power for operating the imaging unit 213. If the operation mode of the electronic apparatus 200 is the charging mode and the electronic apparatus 200 transmits video data to the power supply apparatus 100, the operation information includes information indicating power for charging the battery 210 and information indicating power for operating the communication unit 212. If the operation mode of the electronic apparatus 200 is the shooting mode and the electronic apparatus 200 transmits video data to the power supply apparatus 100, the operation information includes information indicating power for operating the imaging unit 213 and information indicating power for operating the communication unit 212.

The CPU 205 may detect the operation information from the information indicating power required for the operation and process performed in the electronic apparatus 200 previously recorded in the ROM 206. Further, the CPU 205 may detect the power consumption of the electronic apparatus 200 to detect the operation information from the detected power consumption.

The ROM 206 stores information about a computer program for controlling the operation of the electronic apparatus 200 and a parameter related to the operation of the electronic apparatus 200. The ROM 206 records identification information about the electronic apparatus 200, device information about the electronic apparatus 200, display data, and the like.

The identification information about the electronic apparatus 200 refers to information indicating an identification (ID) of the electronic apparatus 200 and a communication address of the electronic apparatus 200, for example. The device information about the electronic apparatus 200 includes a manufacturer's name, an apparatus name, a production date, and power reception information of the electronic apparatus 200.

The power reception information of the electronic apparatus 200 includes information indicating the maximum power which can be received by the electronic apparatus 200, information indicating the minimum power which can be received by the electronic apparatus 200, and information indicating power required for the electronic apparatus 200 communicating with the power supply apparatus 100 by a command. The power reception information of the electronic apparatus 200 further includes information indicating power required for the electronic apparatus 200 to operate the communication unit 212, information indicating power required for the electronic apparatus 200 to perform charging, and information indicating power required for the electronic apparatus 200 to operate the imaging unit 213. The power reception information of the electronic apparatus 200 still further includes information indicating power required for the electronic apparatus 200 to operate the recording unit 214.

The RAM 207 is a rewritable nonvolatile memory and temporarily records computer programs for controlling the operation of the electronic apparatus 200, information such as parameters related to the operation of the electronic apparatus 200, and information transmitted from the power supply apparatus 100.

The regulator 208 performs control so that any one of the voltage of DC power supplied from the rectification and smoothing circuit 203 and the voltage of the power supplied from the battery 210 can be equal to the voltage value set by the CPU 205. The regulator 208 may be a switching regulator or a linear regulator.

If power is supplied not from the battery 210 but from the power supply apparatus 100, the regulator 208 supplies the DC power supplied from the rectification and smoothing circuit 203 to the entire electronic apparatus 200.

If power is supplied not from the power supply apparatus 100 but from the battery 210, the regulator 208 supplies the power supplied from the battery 210 to the entire electronic apparatus 200.

If power is supplied from the power supply apparatus 100 and the battery 210, the regulator 208 may supply the DC power supplied from the rectification and smoothing circuit 203 and the power supplied from the battery 210 to the entire electronic apparatus 200.

If power is supplied from the regulator 208, the charging control unit 209 charges the battery 210 according to the supplied power. The charging control unit 209 charges the battery 210 by a constant-voltage/constant-current method. The charging control unit 209 periodically detects information indicating a remaining capacity of the attached battery 210 and supplies the information to the CPU 205.

Hereinafter, the information indicating a remaining capacity of the attached battery 210 is referred to as "remaining capacity information."

The CPU 205 records the remaining capacity information in the RAM 207.

The remaining capacity information may further include information indicating whether the battery is fully charged or information indicating time elapsed after the charging control unit 209 starts to charge the battery 210. Furthermore, the remaining capacity information may include information indicating that the charging control unit 209 is charging the battery 210 according to constant-voltage control or information indicating that the charging control unit 209 is charging the battery 210 according to constant-current control.

If the charging control unit 209 charges the battery 210, the charging control unit 209 detects current flowing to the battery 210 and voltage supplied to the battery 210, and supplies the detected result to the CPU 205. The CPU 205 records information indicating the current flowing to the battery 210 and information indicating the voltage supplied to the battery 210 which are supplied from the charging control unit 209 in the RAM 207.

The battery 210 can be detached and attached to the electronic apparatus 200. The battery 210 is a chargeable secondary battery and is a lithium ion battery, for example. The battery 210 can supply power to the electronic apparatus 200. The battery 210 may be other batteries except the lithium ion battery.

The timer 211 measures the current time and time related to the operation and process performed by the electronic apparatus 200. A threshold value with respect to the time measured by the timer 211 is previously recorded in the ROM 206.

The communication unit 212 can transmit the video data and the audio data recorded in the ROM 206 and a recording medium 214a to the power supply apparatus 100 and receive the video data and the audio data from the power supply apparatus 100.

The communication unit 212 transmits and receives the video data and the audio data according to the communication protocol common to that of the communication unit 112. For example, the communication unit 212 may transmit and receive the video data and the audio data according to 802.11a, 802.11b, 802.11g, and 802.11n standards regulated in wireless LAN standards.

The imaging unit 213 includes an imaging element for generating video data from optics of an object, an image processing circuit for subjecting the video data generated by the imaging element to an image process, and a compression/decompression circuit for compressing the video data and decompressing the compressed video data. The imaging unit 213 captures an image of an object and supplies video data such as still image and a moving image acquired by a result of capturing the image to the recording unit 214.

The recording unit 214 records the video data supplied from the imaging unit 213 in the recording medium 214a. The imaging unit 213 may further include configuration required for capturing an image of an object.

The recording unit 214 records data such as video data and audio data supplied from any one of the communication unit 212 and the imaging unit 213 in the recording medium 214a.

The recording unit 214 may read data such as the video data and the audio data from the recording medium 214a and supply the data to the RAM 207 and the communication unit 212.

The recording medium 214a may be a hard disk or a memory card, may be incorporated in the electronic apparatus 200, or may be an external recording medium which can be detached from or attached the electronic apparatus 200.

The operation unit 215 provides a user interface for operating the electronic apparatus 200. The operation unit 215 includes a power source button for operating the electronic apparatus 200 and a mode switching button for switching the operation modes of the electronic apparatus 200. Each button is formed of a switch and a touch panel. The CPU 205 controls the electronic apparatus 200 according to user's instruction input via the operation unit 215. The operation unit 215 may control the electronic apparatus 200 according to a remote control signal received from a remote controller (not illustrated).

The power supply antenna 108 and the power receiving antenna 201 may be a helical antenna, a loop antenna, or a planar antenna such as a meander line antenna.

The process performed by the power supply apparatus 100 according to the first exemplary embodiment can also be applied to a system in which the power supply apparatus 100 wirelessly supplies power to the electronic apparatus 200 by electromagnetic field coupling. Similarly, the process performed by the electronic apparatus 200 according to the first exemplary embodiment can also be applied to a system in which the power supply apparatus 100 wirelessly supplies power to the electronic apparatus 200 by electromagnetic field coupling.

The present invention can also be applied to a system in which the power supply apparatus 100 supplies power to the electronic apparatus 200 by electromagnetic field coupling such that an electrode serving as the power supply antenna 108 is provided to the power supply apparatus 100 and an electrode serving as the power receiving antenna 201 is provided to the electronic apparatus 200.

The present invention can also be applied to a system in which the power supply apparatus 100 wirelessly supplies power to the electronic apparatus 200 by electromagnetic induction.

According to the first exemplary embodiment, it is supposed that the power supply apparatus 100 wirelessly transmits power to the electronic apparatus 200 and the electronic apparatus 200 wirelessly receives power from the power supply apparatus 100. "Wireless" may be translated into "non-contact" or "contactless."

[Communication Process]

The communication process performed by the power supply apparatus 100 according to the first exemplary embodiment is described below with reference to a flow chart illustrated in FIG. 3. The communication process illustrated in FIG. 3 is performed by the power supply apparatus 100 for an electronic apparatus existing within a predetermined range.

Figure 3:
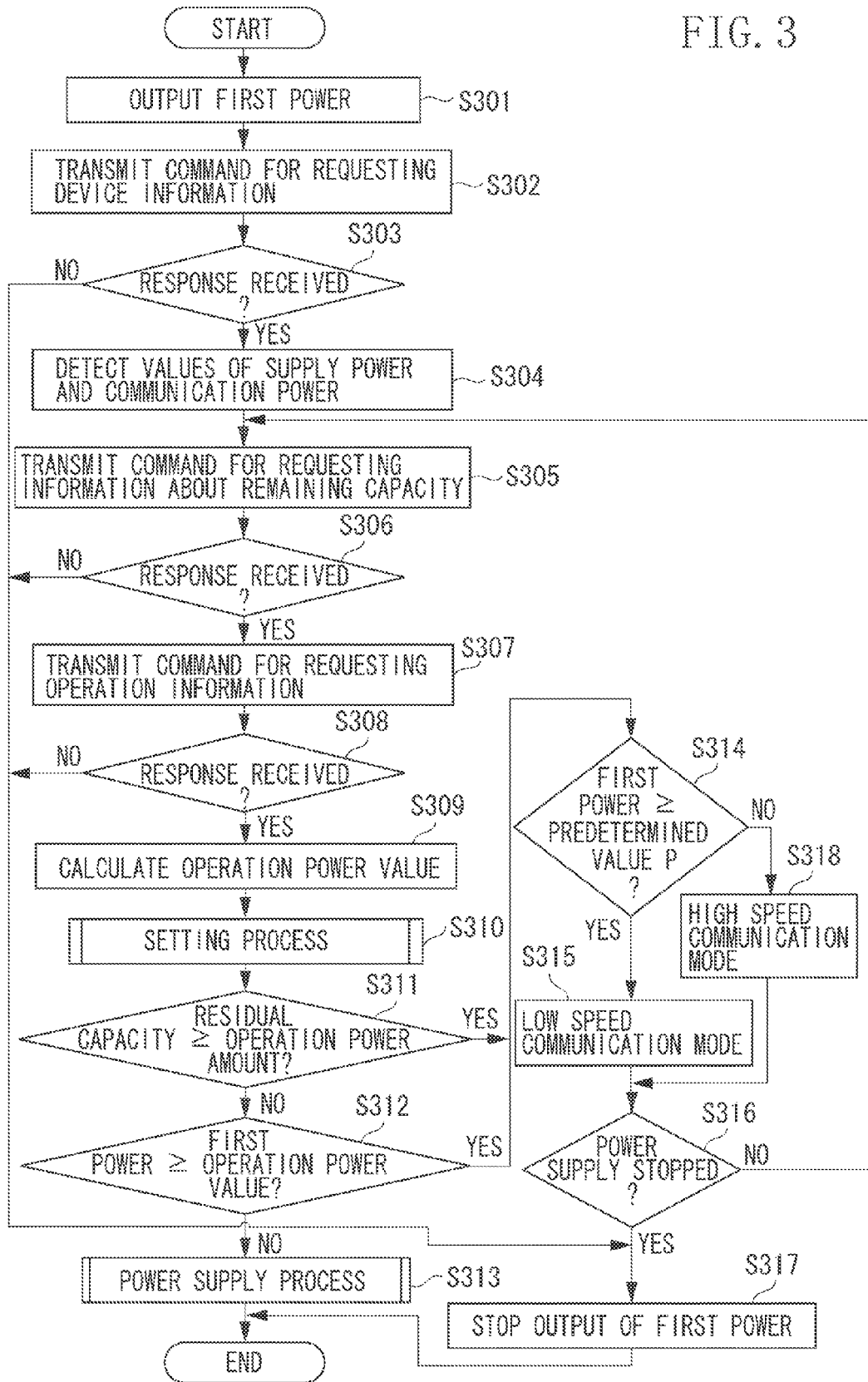
FIG. 3 is a flow chart illustrating an example of a communication process performed by a power supply apparatus according to the first exemplary embodiment.

The following description is an example where the power supply apparatus 100 performs the communication process in FIG. 3 for the electronic apparatus 200. It is assumed that a distance between the power supply apparatus 100 and the electronic apparatus 200 is in the predetermined range. It is also assumed that the power supply apparatus 100 detects that the electronic apparatus 200 is in the predetermined range and already acquires the identification information of the electronic apparatus 200. The process illustrated in the flow chart in FIG. 3 is controlled by the CPU 105 executing the computer program stored in the ROM 106.

In step S301, the CPU 105 controls the oscillator 101, the power transmission circuit 102, and the matching circuit 103 to supply the first power to the electronic apparatus 200. Then, the process proceeds from step S301 to step S302. When the first power is supplied to the electronic apparatus 200, the CPU 105 may transmit information indicating the value of the first power to the electronic apparatus 200 via the power supply antenna 108.

In step S302, the CPU 105 controls the modem circuit 104 to transmit a first command for requesting the device information of the electronic apparatus 200 to the electronic apparatus 200. Then, the process proceeds from step S302 to step S303.

If the electronic apparatus 200 receives the first command, the electronic apparatus 200 reads the device information of the electronic apparatus 200 recorded in the ROM 206 and transmits the device information of the electronic apparatus 200 as a response to the first command to the power supply apparatus 100.

In step S303, the CPU 105 determines whether the modem circuit 104 receives the device information of the electronic apparatus 200 as the response to the first command transmitted to the electronic apparatus 200 in step S302.

If the CPU 105 determines that the modem circuit 104 receives the device information of the electronic apparatus 200 (YES in step S303), the CPU 105 acquires the device information of the electronic apparatus 200 from the modem circuit 104 and records the device information in the RAM 107. Then, the process proceeds from step S303 to step S304.

If the CPU 105 determines that the modem circuit 104 does not receive the device information of the electronic apparatus 200 (NO in step S303), the process proceeds from step S303 to step S317.

In step S304, the CPU 105 sets a communication power value and a supply power value according to the device information of the electronic apparatus 200 acquired from the electronic apparatus 200.

The communication power value refers to a first maximum power that the power supply apparatus 100 can supply to the electronic apparatus 200. The supply power value refers to a second maximum power that the power supply apparatus 100 can supply to the electronic apparatus 200.

The CPU 105 acquires information indicating the value of the maximum power which the electronic apparatus 200 can receive from the power reception information included in the device information of the electronic apparatus 200 acquired in step S303 to set the values of communication power and supply power. For this reason, the communication power value set by the CPU 105 is less than or equal to the maximum power which can be received by the electronic apparatus 200 and is equal to or smaller than the first maximum power which can be generated by the power transmission circuit 102.

The supply power value set by the CPU 105 is equal to or smaller than the maximum power which can be received by the electronic apparatus 200 and is equal to or smaller than the second maximum power which can be generated by the power transmission circuit 102.

The values of communication power and supply power set by the CPU 105 are recorded in the RAM 107. If the values of communication power and supply power are set by the CPU 105, the process proceeds from step S304 to step S305.

In step S305, the CPU 105 controls the modem circuit 104 to transmit a second command for requesting the remaining capacity information of the electronic apparatus 200 to the electronic apparatus 200. Then, the process proceeds from step S305 to step S306.

If the electronic apparatus 200 receives the second command, the electronic apparatus 200 reads the remaining capacity information of the electronic apparatus 200 recorded in the RAM 207 and transmits the remaining capacity information of the electronic apparatus 200 as a response to the second command to the power supply apparatus 100.

In step S306, the CPU 105 determines whether the modem circuit 104 receives the remaining capacity information of the electronic apparatus 200 as the response to the second command transmitted to the electronic apparatus 200 in step S305.

If the CPU 105 determines that the modem circuit 104 receives the remaining capacity information of the electronic apparatus 200 (YES in step S306), the CPU 105 acquires the remaining capacity information of the electronic apparatus 200 from the modem circuit 104 and records the remaining capacity information of the electronic apparatus 200 in the RAM 107. Then, the process proceeds from step S306 to step S307.

If the CPU 105 determines that the modem circuit 104 does not receive the remaining capacity information of the electronic apparatus 200 (NO in step S306), the process proceeds from step S306 to step S317.

In step S307, the CPU 105 controls the modem circuit 104 to transmit a third command for requesting the operation information of the electronic apparatus 200 to the electronic apparatus 200. Then, the process proceeds from step S307 to step S308.

If the electronic apparatus 200 receives the third command, the electronic apparatus 200 reads the operation information of the electronic apparatus 200 recorded in the RAM 207 and transmits the operation information of the electronic apparatus 200 as a response to the third command to the power supply apparatus 100.

In step S308, the CPU 105 determines whether the modem circuit 104 receives the operation information of the electronic apparatus 200 as the response to the third command transmitted to the electronic apparatus 200 in step S307.

If the CPU 105 determines that the modem circuit 104 receives the operation information of the electronic apparatus 200 (YES in step S308), the CPU 105 acquires the operation information of the electronic apparatus 200 from the modem circuit 104 and records the operation information of the electronic apparatus 200 in the RAM 107. Then, the process proceeds from step S308 to step S309.

If the CPU 105 determines that the modem circuit 104 does not receive the operation information of the electronic apparatus 200 (NO in step S308), the process proceeds from step S308 to step S317.

In step S309, the CPU 105 calculates an operation power value according to the operation information of the electronic apparatus 200.

The operation power value refers to the value of power corresponding to an operation state of the electronic apparatus 200 indicated by the operation information of the electronic apparatus 200 acquired from the electronic apparatus 200. The operation state of the electronic apparatus 200 indicates the operation and process performed by the electronic apparatus 200.

The operation power value calculated by the CPU 105 from the operation information of the electronic apparatus 200 is recorded in the RAM 107. If the operation power value is calculated by the CPU 105, the process proceeds from step S309 to step S310.

In step S310, the CPU 105 performs a setting process. The setting process is a process for setting a value of a first power generated by the power transmission circuit 102 and a value of a second power generated by the power transmission circuit 102. The CPU 105 performs the process in step S310 to set the power that the power supply apparatus 100 supplies to the electronic apparatus 200. The setting process is described below. If the setting process is performed by the CPU 105, the process proceeds from step S310 to step S311. If the process in step S310 is performed, the CPU 105 controls the power transmission circuit 102 to generate the first power according to the value of the first power set by the setting process.

In step S311, the CPU 105 determines whether the remaining capacity of the battery 210 is equal to or greater than an operation power amount corresponding to the operation power value. The operation power value in step S311 is the one calculated by the CPU 105 in step S309. The operation power amount refers to a value calculated by the product of the operation power value and time for which the operation and process are performed by the electronic apparatus 200.

In step S311, the CPU 105 may acquire information indicating the operation power amount from the electronic apparatus 200.

In step S311, the CPU 105 may acquire information indicating time for which the operation and process are performed by the electronic apparatus 200 from the electronic apparatus 200. In this case, the CPU 105 calculates the operation power amount according to the operation power value calculated in step S309 and the time for which the operation and process are performed by the electronic apparatus 200.

If the CPU 105 determines that the modem circuit 104 receives the remaining capacity information of the electronic apparatus 200 (YES in step S306), the CPU 105 acquires the remaining capacity of the battery 210 according to the remaining capacity information of the electronic apparatus 200 acquired from the electronic apparatus 200.

If the CPU 105 determines that the remaining capacity of the battery 210 is equal to or greater than the operation power amount (YES in step S311), the process proceeds from step S311 to step S314.

If the CPU 105 determines that the remaining capacity of the battery 210 is smaller than the operation power amount (NO in step S311), the process proceeds from step S311 to step S312.

In step S312, the CPU 105 determines whether the first power generated by the power transmission circuit 102 is equal to or greater than the operation power value.

The operation power value in step S312 is the value calculated by the CPU 105 in step S309.

If the CPU 105 determines that the first power generated by the power transmission circuit 102 is equal to or greater than the operation power value (YES in step S312), the process proceeds from step S312 to step S314. If the CPU 105 determines that the first power generated by the power transmission circuit 102 is smaller than the operation power value (NO in step S312), the process proceeds from step S312 to step S313.

In step S312, the CPU 105 performs a power supply process. The power supply process is a process for the power supply apparatus 100 to supply the second power to an apparatus to be supplied with power. The CPU 105 performs the process in step S310 to supply the second power to the electronic apparatus 200. The power supply process is described below. If the power supply process is performed by the CPU 105, the process in the flow chart in FIG. 3 is terminated.

In step S314, the CPU 105 determines whether the first power generated by the power transmission circuit 102 is equal to or greater than a predetermined value P. The predetermined value P may be a value previously recorded in the ROM 106 or a value that can be set by the user. Further, the predetermined value P may be a value that is set by the CPU 105 according to information acquired from the electronic apparatus 200.

If the CPU 105 determines that the first power is equal to or greater than the predetermined value P (YES in step S314), the process proceeds from step S314 to step S315.

If the CPU 105 determines that the first power is smaller than the predetermined value P (NO in step S314), the process proceeds from step S314 to step S318.

In step S315, the CPU 105 performs control to change the operation mode of the power supply apparatus 100 to the low speed communication mode.

Figure 6A:
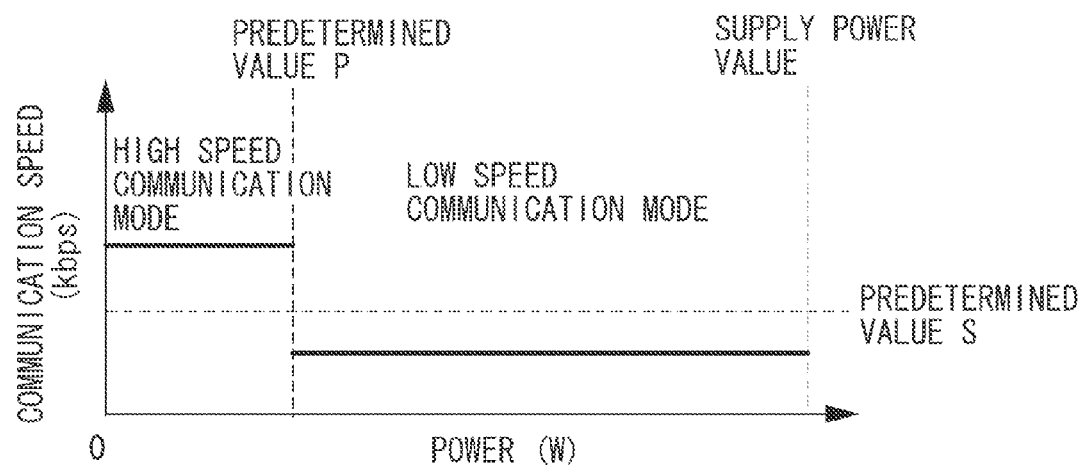
FIGS. 6A and 6B are graphs illustrating examples of communication tables according to the first exemplary embodiment.

The CPU 105 detects the communication speed according to the value of the first power generated by the power transmission circuit 102 and a communication speed table illustrated in FIG. 6A recorded in the ROM 106.

The communication speed table illustrated in FIG. 6A is previously recorded in the ROM 106. The communication speed table is a table in which the power generated by the power transmission circuit 102 corresponds to the communication speed. The supply power value in FIG. 6A corresponds to the supply power value set by the CPU 105 according to the device information of the electronic apparatus 200, for example. A predetermined value P in FIG. 6A corresponds to the predetermined value P in step S314.

The CPU 105 controls the modem circuit 104 according to the detected communication speed. If the operation mode of the power supply apparatus 100 is changed to the low speed communication mode, the CPU 105 controls amplitude modulation performed by the modem circuit 104 so that the communication speed becomes equal to or lower than a predetermined value S. The predetermined value S may be a value previously recorded in the ROM 106 or a value that can be set by the user. Further, the predetermined value S may be a value that is set by the CPU 105 according to information acquired from the electronic apparatus 200.

If the operation mode of the power supply apparatus 100 is the low speed communication mode, the CPU 105 may correct the detected communication speed according to the command or information transmitted to the electronic apparatus 200. In this case, the CPU 105 detects the capacity of data such as the command or information generated by the modem circuit 104 to correct the detected communication speed according to the capacity of the detected data.

If the capacity of data such as the command or information generated by the modem circuit 104 is greater than a predetermined capacity, the CPU 105 performs correction to make the communication speed higher than that in the case where the capacity of data such as the command or information generated by the modem circuit 104 is equal to or smaller than the predetermined capacity.

If the operation mode of the power supply apparatus 100 is the low speed communication mode and even if the capacity of data such as the command or information generated by the modem circuit 104 is greater than the predetermined capacity, the CPU 105 makes the communication speed equal to or smaller than the predetermined value S. Accordingly, the CPU 105 can set the communication speed according to the capacity of data such as the command or information generated by the modem circuit 104 and transmitted to the electronic apparatus 200 via the power supply antenna 108.

If the operation mode of the power supply apparatus 100 is changed to the low speed communication mode, the process proceeds from step S315 to step S316.

In step S316, the CPU 105 determines whether to stop the process for supplying power to the electronic apparatus 200. The process for supplying power to the electronic apparatus 200 is a process for the power supply apparatus 100 to supply any one of the first and the second power to the electronic apparatus 200.

The CPU 105 may determine whether to stop the process for supplying power to the electronic apparatus 200 by determining whether an error occurs in the power supply apparatus 100, for example. If the CPU 105 determines that the error occurs in the power supply apparatus 100, the CPU 105 determines to stop the process for supplying power to the electronic apparatus 200 (YES in step S316). If the CPU 105 determines that the error does not occur in the power supply apparatus 100, the CPU 105 determines not to stop the process for supplying power to the electronic apparatus 200 (NO in step S316).

In addition, if the electronic apparatus 200 is charging the battery 210, the CPU 105 may determine whether to stop the process for supplying power to the electronic apparatus 200 by determining whether the remaining capacity of the battery 210 is equal to the fully charged capacity, for example. If the CPU 105 determines that the remaining capacity of the battery 210 is equal to the fully charged capacity, the CPU 105 determines to stop the process for supplying power to the electronic apparatus 200 (YES in step S316). If the CPU 105 determines that the remaining capacity of the battery 210 is not equal to the fully charged capacity, the CPU 105 determines not to stop the process for supplying power to the electronic apparatus 200 (NO in step S316).

Further, for example, The CPU 105 may determine whether to stop the process for supplying power to the electronic apparatus 200 by determining whether an error occurs in the electronic apparatus 200. If the CPU 105 determines that error information is received from the electronic apparatus 200, the CPU 105 determines to stop the process for supplying power to the electronic apparatus 200 (YES in step S316). If the CPU 105 determines that error information is not received from the electronic apparatus 200, the CPU 105 determines not to stop the process for supplying power to the electronic apparatus 200 (NO in step S316).

Further, for example, the CPU 105 may determine whether to stop the process for supplying power to the electronic apparatus 200 by determining whether to detect that the electronic apparatus 200 is removed within the predetermined range.

If the CPU 105 determines to detect that the electronic apparatus 200 is removed within the predetermined range, the CPU 105 determines to stop the process for supplying power to the electronic apparatus 200 (YES in step S316). If the CPU 105 determines to detect that the electronic apparatus 200 is not removed within the predetermined range, the CPU 105 determines not to stop the process for supplying power to the electronic apparatus 200 (NO in step S316). The CPU 105 may transmit a command for confirming if the electronic apparatus 200 is within the predetermined range to the electronic apparatus 200 and determine whether the electronic apparatus 200 is removed within the predetermined range according to a response from the electronic apparatus 200.

Further, for example, the CPU 105 may determine whether to stop the process for supplying power to the electronic apparatus 200 by determining whether power needs to be supplied to the electronic apparatus 200. In this case, the CPU 105 may inquire of the electronic apparatus 200 whether the electronic apparatus 200 is connected with an AC power source (not illustrated).

If the CPU 105 determines that the electronic apparatus 200 is not connected with the AC power source (not illustrated), the CPU 105 determines to stop the process for supplying power to the electronic apparatus 200 (YES in step S316).

If the CPU 105 determines that the electronic apparatus 200 is connected with the AC power source (not illustrated), the CPU 105 determines not to stop the process for supplying power to the electronic apparatus 200 (NO in step S316).

If the CPU 105 determines to stop the process for supplying power to the electronic apparatus 200 (YES in step S316), the process proceeds from step S316 to step S317.

If the CPU 105 determines not to stop the process for supplying power to the electronic apparatus 200 (NO in step S316), the process proceeds from step S316 to step S305.

In step S317, the CPU 105 controls any one of the oscillator 101, the power transmission circuit 102, and the matching circuit 103 to stop the supply of the first power to the electronic apparatus 200. When the first power is generated by the power transmission circuit 102, the CPU 105 controls any of the oscillator 101, the power transmission circuit 102, and the matching circuit 103 to stop the supply of the first power to the electronic apparatus 200. Then, the process in the flow chart in FIG. 3 is terminated.

In step S317, the CPU 105 may stop the supply of the first power to the electronic apparatus 200 by controlling the value of the variable capacitor or the variable coil included in the matching circuit 103 to shut off the resonance between the power supply apparatus 100 and the electronic apparatus 200. Further, in step S317, the CPU 105 may stop the supply of the first power to the electronic apparatus 200 by stopping the oscillation of the oscillator 101. Furthermore, in step S317, the CPU 105 may stop the supply of the first power to the electronic apparatus 200 by stopping the generation of the first power by the power transmission circuit 102.

In step S318, the CPU 105 performs control to change the operation mode of the power supply apparatus 100 to the high speed communication mode. In this case, the CPU 105 detects the communication speed according to the value of the first power generated by the power transmission circuit 102 and the communication speed table in FIG. 6A recorded in the ROM 106. The CPU 105 further controls the modem circuit 104 according to the detected communication speed. If the operation mode of the power supply apparatus 100 is changed to the high speed communication mode, the CPU 105 controls amplitude modulation performed by the modem circuit 104 so that the communication speed becomes higher than the predetermined value S.

If the operation mode of the power supply apparatus 100 is the high speed communication mode, the CPU 105 may correct the detected communication speed according to the command or information transmitted to the electronic apparatus 200. In this case, the CPU 105 detects the capacity of data such as the command or information generated by the modem circuit 104 to correct the detected communication speed according to the capacity of the detected data.

If the capacity of data such as the command or information generated by the modem circuit 104 is greater than a predetermined capacity, the CPU 105 performs correction to make the communication speed higher than that in the case where the capacity of data such as the command or information generated by the modem circuit 104 is equal to or smaller than the predetermined capacity. Accordingly, the CPU 105 can set the communication speed according to the capacity of data such as the command or information generated by the modem circuit 104 and transmitted to the electronic apparatus 200 via the power supply antenna 108.

If the operation mode of the power supply apparatus 100 is changed to the high speed communication mode, the process proceeds from step S318 to step S316.

Even if it is determined that the remaining capacity of the battery 210 is equal to or greater than the operation power amount (YES in step S311), the CPU 105 performs the power supply process in step S313 when the operation for starting the power supply process is performed for the electronic apparatus 200.

Even if it is determined that the first power is equal to or greater than the operation power value (YES in step S312), the CPU 105 performs the power supply process in step S313 when the operation for starting the power supply process is performed for the electronic apparatus 200.

Even if the CPU 105 performs the communication process in FIG. 3, the CPU 105 changes the power generated by the power transmission circuit 102 to be smaller than the predetermined value P when the CPU 105 detects that an error occurs in the power supply apparatus 100. Further, the CPU 105 supplies the first power lower than the predetermined value P to the electronic apparatus 200 and transmits a command notifying the occurrence of error in the power supply apparatus 100 to the electronic apparatus 200.

In this case, the CPU 105 may control the modem circuit 104 so that the communication speed is made equal to the maximum speed by automatically changing the operation mode of the power supply apparatus 100 to the high speed communication mode. In this case, the communication speed is controlled by the CPU 105 so that the communication speed reaches the maximum speed at which the power supply apparatus 100 transmits data to the electronic apparatus 200.

In step S311, the CPU 105 determines whether the remaining capacity of the battery 210 is equal to or greater than the operation power amount. However, the CPU 105 may determine whether the remaining capacity of the battery 210 is greater than or equal to a specific value.

[Setting Process]

The setting process performed by the power supply apparatus 100 in the process in step S310 according to the first exemplary embodiment is described below with reference to the flow chart in FIG. 4. The setting process illustrated in FIG. 4 is performed by the CPU 105.

The process illustrated in the flow chart of FIG. 4 is controlled by the CPU 105 executing the computer program stored in the ROM 106.

In step S401, the CPU 105 determines whether the operation power value is equal to or greater than the communication power value. The communication power value is a value acquired in step S304. The operation power value is a value calculated in step S309.

If the CPU 105 determines that the operation power value is equal to or greater than the communication power value (YES in step S401), the process proceeds from step S401 to step S405.

If the CPU 105 determines that the operation power value is smaller than the communication power value (NO in step S401), the process proceeds from step S401 to step S402.

In step S402, the CPU 105 sets the value of the first power according to the operation power value calculated in step S309. The CPU 105 sets the value of the first power to a value that is equal to or greater than the operation power value calculated in step S309 and smaller than the value of the first maximum power. The value of the first power set by the CPU 105 is recorded in the RAM 107. If the value of the first power is set, the process proceeds from step S402 to step S403.

In step S403, the CPU 105 determines whether the operation power value is equal to or greater than the supply power value. The supply power value is a value acquired in step S304. The operation power value is a value calculated in step S309.

If the CPU 105 determines that the operation power value is equal to or greater than the supply power value (YES in step S403), the process proceeds from step S403 to step S406.

If the CPU 105 determines that the operation power value is smaller than the supply power value (NO in step S403), the process proceeds from step S403 to step S404.

In step S404, the CPU 105 sets the value of the second power according to the operation power value calculated in step S309. The CPU 105 sets the value of the second power to a value that is greater than or equal to the operation power value calculated in step S309 and smaller than the value of the second maximum power. The value of the second power set by the CPU 105 is recorded in the RAM 107. If the value of the second power is set, the process in the flow chart in FIG. 4 is terminated.

In step S405, the CPU 105 sets the value of the first power according to the value of the first maximum power acquired in step S304. The CPU 105 sets the value of the first power to a value that is equal to the communication power value calculated in step S304. The value of the first power set by the CPU 105 is recorded in the RAM 107. If the value of the first power is set, the process proceeds from step S405 to step S403.

In step S406, the CPU 105 sets the value of the second power according to the supply power value acquired in step S304. The CPU 105 sets the value of the second power to a value that is equal to the value of the second maximum power acquired in step S304. The value of the second power set by the CPU 105 is recorded in the RAM 107. If the value of the second power is set, the process in the flow chart in FIG. 4 is terminated.

[Supply Power Process]

Figure 5A:
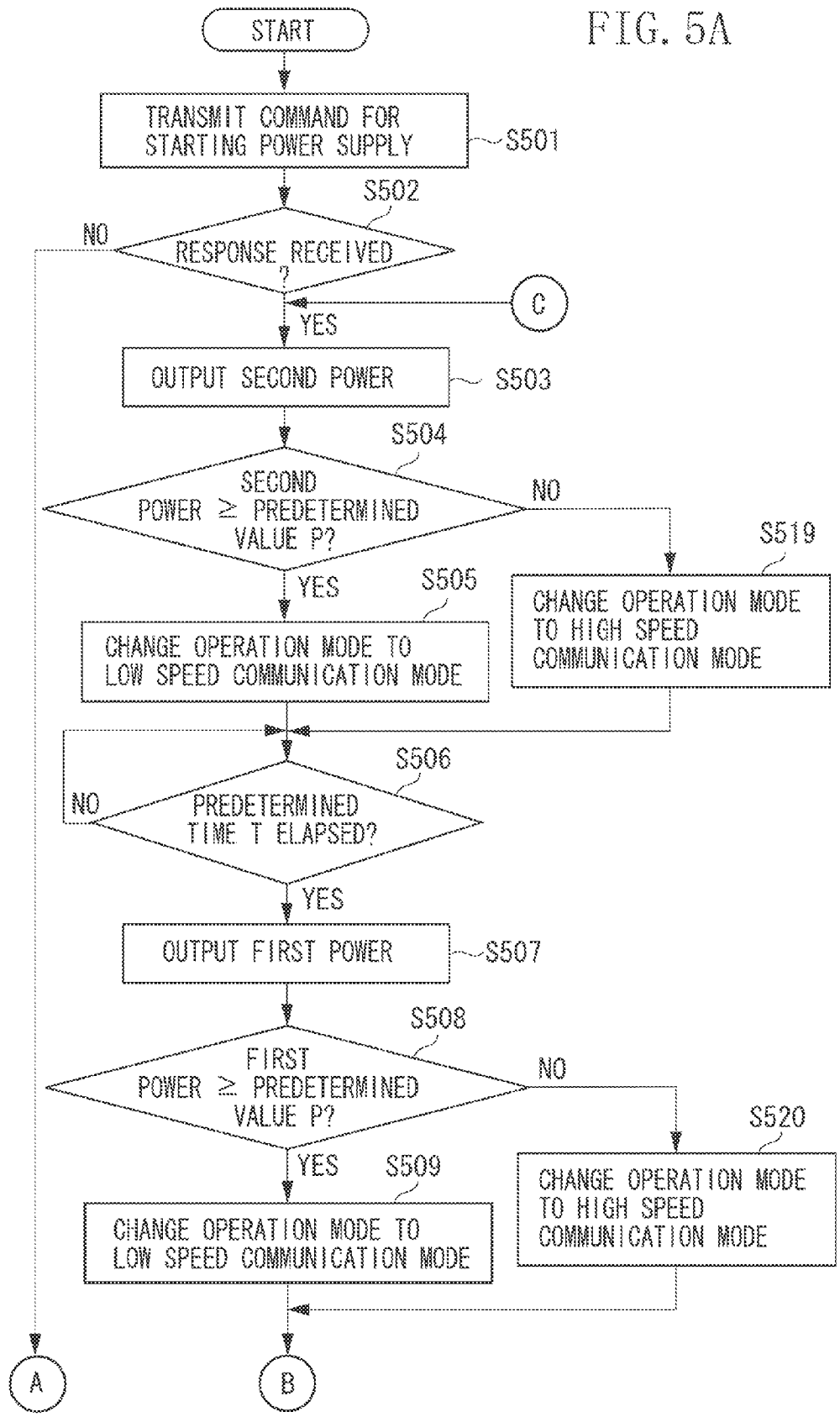
FIG. 5 (including FIGS. 5A and 5B) is a flow chart illustrating an example of a power supply process performed by the power supply apparatus according to the first exemplary embodiment.

The supply power process performed by the power supply apparatus 100 in the process in step S313 according to the first exemplary embodiment is described below with reference to the flow chart in FIG. 5 (including FIGS. 5A and 5B). The supply power process illustrated in FIG. 5 is performed by the CPU 105 when the power supply apparatus 100 selects an electronic apparatus to be supplied with power.

The supply power process is described below using an example in which the electronic apparatus 200 is selected as an electronic apparatus to be supplied with power. The process illustrated in FIG. 5 is controlled by the CPU 105 executing the computer program stored in the ROM 106.

In step S501, the CPU 105 controls the matching circuit 103 and the modem circuit 104 to transmit to the electronic apparatus 200 a fourth command for notifying the electronic apparatus 200 of the start of the process for supplying the second power to the electronic apparatus 200. Then, the process proceeds from step S501 to step S502.

In step S502, the CPU 105 determines whether the modem circuit 104 receives a response to the fourth command transmitted to the electronic apparatus 200 in step S501.

If the CPU 105 determines that the modem circuit 104 receives the response to the fourth command (YES in step S502), the CPU 105 determines that the operation mode of the electronic apparatus 200 is changed to a mode in which the electronic apparatus 200 can receive the second power supplied from the power supply apparatus 100. Then, the process proceeds from step S502 to step S503.

If the CPU 105 determines that the modem circuit 104 does not receive the response to the fourth command (NO in step S502), the CPU 105 determines that the operation mode of the electronic apparatus 200 is not changed to the mode in which the electronic apparatus 200 can receive the second power supplied from the power supply apparatus 100. Then, the process proceeds from step S502 to step S517.

In step S503, the CPU 105 controls the oscillator 101, the power transmission circuit 102, and the matching circuit 103 to supply the second power to the electronic apparatus 200 via the power supply antenna 108.

When the second power is supplied to the electronic apparatus 200, the CPU may supply information indicating the value of the second power to the electronic apparatus 200 via the power supply antenna 108.

The CPU 105 controls the oscillator 101, the power transmission circuit 102, and the matching circuit 103 to output the second power according to the value of the second power set by the setting process in FIG. 4. When the second power is output via the power supply antenna 108, the CPU 105 controls the timer 109 to measure the time elapsed after the second power is output via the power supply antenna 108. Information indicating the time measured by the timer 109 is recorded in the RAM 107. Then, the process proceeds from step S503 to step S504.

In step S504, the CPU 105 determines whether the value of the second power generated in the power transmission circuit 102 is equal to or greater than the predetermined value P. It is presumed that the predetermined value P in step S504 is the same as the predetermined value P in step S314.

If the CPU 105 determines that the value of the second power is equal to or greater than the predetermined value P (YES in step S504), the process proceeds from step S504 to step S505.

If the CPU 105 determines that the value of the second power is smaller than the predetermined value P (NO in step S504), the process proceeds from step S504 to step S519.

In step S505, the CPU 105 performs control so that the operation mode of the power supply apparatus 100 is changed to the low speed communication mode.

The CPU 105 detects the communication speed according to the value of the second power generated by the power transmission circuit 102 and the communication speed table in FIG. 6A recorded in the ROM 106.

The CPU 105 controls the modem circuit 104 according to the detected communication speed. If the operation mode of the power supply apparatus 100 is changed to the low speed communication mode, the CPU 105 controls amplitude modulation performed by the modem circuit 104 so that the communication speed becomes equal to or lower than the predetermined value S.

If the operation mode of the power supply apparatus 100 is changed to the low speed communication mode, the process proceeds from step S505 to step S506.

In step S506, the CPU 105 determines whether the time measured by the timer 109 reaches a predetermined time T.

If the CPU 105 determines that the time measured by the timer 109 reaches the predetermined time T (YES in step S506), the CPU 105 determines that the predetermined time T elapses. Then, the process proceeds from step S506 to step S507. Further, in this case (YES in step S506), the CPU 105 controls the timer 109 to stop measuring time.

If the CPU 105 determines that the time measured by the timer 109 does not reach the predetermined time T (NO in step S506), the CPU 105 determines that the predetermined time T does not elapse. Then, the process in the process in the flow chart returns from step S506 to step S506.

In step S507, the CPU 105 controls the oscillator 101, the power transmission circuit 102, and the matching circuit 103 to output the first power. The CPU 105 controls the oscillator 101, the power transmission circuit 102, and the matching circuit 103 to output the first power according to the value of the first power set by the setting process in FIG. 4. Then, the process proceeds from step S507 to step S508.

Similarly to step S314, in step S508, the CPU 105 determines whether the value of the first power generated by the power transmission circuit 102 is equal to or greater than the predetermined value P.

If the CPU 105 determines that the value of the first power is equal to or greater than the predetermined value P (YES in step S508), the process proceeds from step S508 to step S509.

If the CPU 105 determines that the value of the first power is smaller than the predetermined value P (NO in step S508), the process proceeds from step S508 to step S520.

Similarly to step S315, in step S509, the CPU 105 performs control to change the operation mode of the power supply apparatus 100 to the low speed communication mode.

The CPU 105 detects the communication speed according to the value of the first power generated by the power transmission circuit 102 and the communication speed table in FIG. 6A recorded in the ROM 106 to control the modem circuit 104 according to the detected communication speed. If the operation mode of the power supply apparatus 100 is changed to the low speed communication mode, the CPU 105 controls amplitude modulation performed by the modem circuit 104 so that the communication speed becomes equal to or lower than the predetermined value S.

If the operation mode of the power supply apparatus 100 is changed to the low speed communication mode, the process proceeds from step S509 to step S510.

Similarly to step S316, in step S510, the CPU 105 determines whether to stop the process for transmitting power to the electronic apparatus 200. If the CPU 105 determines to stop the process for transmitting power to the electronic apparatus 200 (YES in step S510), the process proceeds from step S510 to step S517.

If the CPU 105 determines not to stop the process for transmitting power to the electronic apparatus 200 (NO in step S510), the process proceeds from step S510 to step S511.

Similarly to step S305, in step S511, the CPU 105 controls the modem circuit 104 to transmit the second command to the electronic apparatus 200. Then, the process proceeds from step S511 to step S512.

In step S512, the CPU 105 determines whether the modem circuit 104 receives the remaining capacity information of the electronic apparatus 200 as the response to the second command transmitted to the electronic apparatus 200 in step S511.

If the CPU 105 determines that the modem circuit 104 receives the remaining capacity information of the electronic apparatus 200 (YES in step S512), the CPU 105 acquires the remaining capacity information of the electronic apparatus 200 from the modem circuit 104 and records the remaining capacity information of the electronic apparatus 200 in the RAM 107. Then, the process proceeds from step S512 to step S513.

If the CPU 105 determines that the modem circuit 104 does not receive the remaining capacity information of the electronic apparatus 200 (NO in step S512), the process proceeds from step S512 to step S517.

In step S513, the CPU 105 controls the modem circuit 104 to transmit the third command to the electronic apparatus 200. Then, the process proceeds from step S513 to step S514.

In step S514, the CPU 105 determines whether the modem circuit 104 receives the operation information of the electronic apparatus 200 as the response to the third command transmitted to the electronic apparatus 200 in step S513.

If the CPU 105 determines that the modem circuit 104 receives the operation information of the electronic apparatus 200 (YES in step S514), the CPU 105 acquires the operation information of the electronic apparatus 200 from the modem circuit 104 and records the operation information in the RAM 107. Then, the process proceeds from step S514 to step S515.

If the CPU 105 determines that the modem circuit 104 does not receive the operation information of the electronic apparatus 200 (NO in step S514), the process proceeds from step S514 to step S517.

Similarly to step S309, in step S515, the CPU 105 calculates the operation power value according to the operation information of the electronic apparatus 200. The operation information of the electronic apparatus 200 in step S515 is the one that is acquired in step S514. The operation power value calculated by the CPU 105 is recorded in the RAM 107. If the operation power value is calculated by the CPU 105, the process proceeds from step S515 to step S516.

In step S516, the CPU 105 determines whether the battery 210 of the electronic apparatus 200 is fully charged according to the remaining capacity information of the electronic apparatus 200. The remaining capacity information of the electronic apparatus 200 is the one that is acquired in step S512.

If the CPU 105 determines that the battery 210 of the electronic apparatus 200 is fully charged (YES in step S516), the process proceeds from step S516 to step S517.

If the CPU 105 determines that the battery 210 of the electronic apparatus 200 is not fully charged (NO in step S516), the process proceeds from step S516 to step S521.

In step S517, the CPU 105 controls the modem circuit 104 to transmit to the electronic apparatus 200 a fifth command for notifying the electronic apparatus 200 of the stop of supplying the second power to the electronic apparatus 200. Then, the process proceeds from step S517 to step S518.

In step S518, the CPU 105 controls any of the oscillator 101, the power transmission circuit 102, and the matching circuit 103 to stop the first power supplied to the electronic apparatus 200. Then, the process in the flow chart in FIG. 5 is terminated.

In step S519, the CPU 105 performs control so that the operation mode of the power supply apparatus 100 is changed to the high speed communication mode. In this case, the CPU 105 detects the communication speed according to the value of the second power generated by the power transmission circuit 102 and the communication speed table in FIG. 6A recorded in the ROM 106. If the operation mode of the power supply apparatus 100 is changed to the high speed communication mode, the CPU 105 controls amplitude modulation performed by the modem circuit 104 so that the communication speed becomes higher than the predetermined value S.

If the operation mode of the power supply apparatus 100 is changed to the high speed communication mode, the process proceeds from step S519 to step S506.

Similarly to step S318, in step S520, the CPU 105 performs control to change the operation mode of the power supply apparatus 100 to the high speed communication mode. In this case, the CPU 105 detects the communication speed according to the value of the first power generated by the power transmission circuit 102 and the communication speed table in FIG. 6A recorded in the ROM 106. Further, the CPU 105 controls the modem circuit 104 according to the detected communication speed. If the operation mode of the power supply apparatus 100 is changed to the high speed communication mode, the process proceeds from step S520 to step S510.

In step S521, the CPU 105 determines whether the operation power value is changed. The CPU 105 determines whether the operation power value is changed according to the operation power value of the electronic apparatus 200 calculated in step S309 and the operation power value of the electronic apparatus 200 calculated in step S515.

If the CPU 105 determines that the operation power value of the electronic apparatus 200 calculated in step S309 does not match the operation power value of the electronic apparatus 200 calculated in step S515, the CPU 105 determines that the operation power value is changed (YES in step S521). If the CPU 105 determines that the operation power value of the electronic apparatus 200 calculated in step S309 matches the operation power value of the electronic apparatus 200 calculated in step S515, the CPU 105 determines that the operation power value is not changed (NO in step S521).

If the CPU 105 determines that the operation power value is changed (YES in step S521), the process proceeds from step S521 to step S522. If the CPU 105 determines that the operation power value is not changed (NO in step S521), the process in the process in the flow chart returns from step S521 to step S503.

In step S522, the CPU 105 performs the setting process illustrated in FIG. 4. In step S522, the CPU 105 sets the values of the first and the second power according to the operation power value calculated in step S515. In step S522, if the CPU 105 performs the setting process illustrated in FIG. 4, the operation power value compared with the communication power value in step S401 is the one that is calculated in step S515. In step S522, if the CPU 105 performs the setting process illustrated in FIG. 4, the operation power value compared with the supply power value in step S403 is the one that is calculated in step S515.

If the CPU 105 performs the setting process, the process in the flow chart returns from step S522 to step S503. If the process in step S522 is performed, the CPU 105 controls the power transmission circuit 102 to generate the first power according to the value of the first power set in the setting process in step S522. Further, the CPU 105 controls the power transmission circuit 102 to generate the second power according to the value of the second power set in the setting process in step S522.

The second power is supplied from the power supply apparatus 100 to the electronic apparatus 200 via the power supply antenna 108 until the CPU 105 determines that the time measured by the timer 109 reaches the predetermined time T (YES in step S505).

While the power supply apparatus 100 outputs the second power to the electronic apparatus 200, the power supply apparatus 100 cannot transmit a command and information to the electronic apparatus 200 via the power supply antenna 108. Therefore, even if the operation mode of the power supply apparatus 100 is the low speed communication mode, the CPU 105 does not correct the detected communication speed according to the command and information transmitted to the electronic apparatus 200 while the power supply apparatus 100 outputs the second power to the electronic apparatus 200.

Similarly, even if the operation mode of the power supply apparatus 100 is in the high speed communication mode, the CPU 105 does not correct the detected communication speed according to the command and information transmitted to the electronic apparatus 200 while the power supply apparatus 100 outputs the second power to the electronic apparatus 200.

In steps S505 and S519, the CPU 105 sets the communication speed according to the value of the second power and the communication speed table in FIG. 6A, however, the CPU 105 does not set the communication speed according to the command and information transmitted to the electronic apparatus 200.

In the first exemplary embodiment, the CPU 105 detects the communication speed at which the power supply apparatus 100 transmits the command and information to the electronic apparatus 200 via the power supply antenna 108 according to the power generated by the power transmission circuit 102 and the communication speed table in FIG. 6A. However, the present invention is not limited to the above described configuration. For example, the CPU 105 may detect the communication speed at which the power supply apparatus 100 transmits the command and information to the electronic apparatus 200 via the power supply antenna 108 according to the power generated by the power transmission circuit 102 and the communication speed table in FIG. 6B.

Figure 6B:
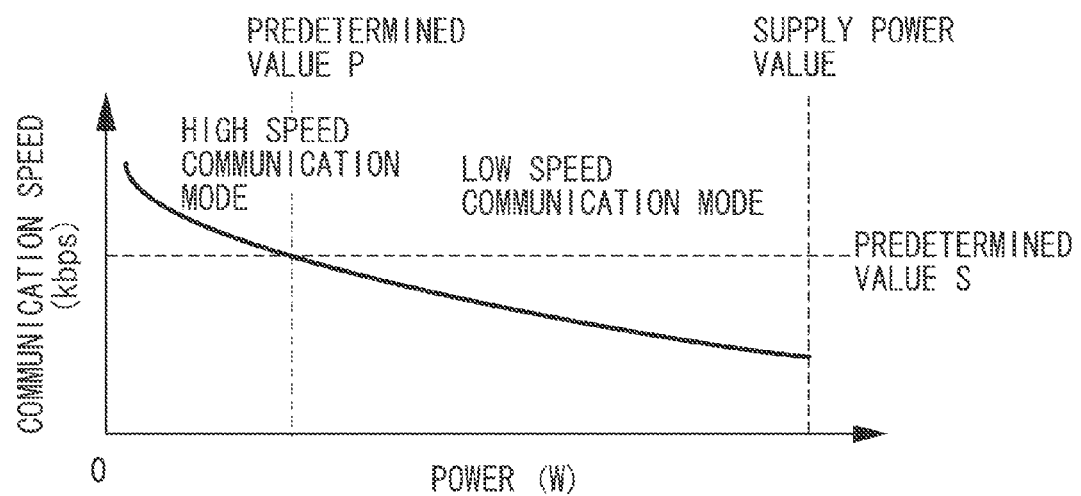

The communication speed table in FIG. 6B is a table in which the power generated by the power transmission circuit 102 corresponds to the communication speed. The supply power value in FIG. 6B corresponds to the supply power value calculated in step S304, for example. The predetermined value P in FIG. 6B corresponds to the predetermined value P used in steps S314, S504, and S508, for example.

If the operation mode of the power supply apparatus 100 is the high speed communication mode, the CPU 105 transmits and receives the command and data to and from the electronic apparatus 200 at the communication speed equal to or higher than the predetermined value S in FIG. 6B. If the operation mode of the power supply apparatus 100 is the low speed communication mode, the CPU 105 transmits and receives the command and data to and from the electronic apparatus 200 at the communication speed lower than the predetermined value S in FIG. 6B.

As described above, if the power generated by the power supply apparatus according to the first exemplary embodiment is supplied to the electronic apparatus, the communication speed at which the command and information are transmitted to the electronic apparatus is set according to the power generated by the power supply apparatus.

Thus, if the first power generated by the power supply apparatus is equal to or greater than the predetermined value P (YES in step S314), the communication speed is set to be smaller than the predetermined value, so that the communication speed can be made slower than the predetermined speed.

Further, if the first power generated by the power supply apparatus is smaller than the predetermined value P (NO in step S314), the communication speed is set to be greater than the predetermined value, so that the communication speed can be made faster than the predetermined speed.

Further, if the first power generated by the power supply apparatus is supplied to the electronic apparatus, the power supply apparatus sets the communication speed according to the capacity of data of the command and information transmitted to the electronic apparatus, so that the power supply apparatus can communicate with the electronic apparatus according to the capacity of data transmitted to the electronic apparatus.

Accordingly, if the capacity of data transmitted to the electronic apparatus is greater than a predetermined capacity, the power supply apparatus can increase the communication speed and transmit data to the electronic apparatus. If the capacity of data transmitted to the electronic apparatus is equal to or smaller than the predetermined capacity, the power supply apparatus can decrease the communication speed and transmit data to the electronic apparatus.

If the second power generated by the power supply apparatus is equal to or greater than the predetermined value P (YES in step S504), the communication speed is set to be smaller than the predetermined value, so that the communication speed can be made slower than the predetermined speed.

Further if the second power generated by the power supply apparatus is smaller than the predetermined value P (NO in step S504), the communication speed is set to be greater than the predetermined value, so that the communication speed can be made faster than the predetermined speed.

Since the power supply apparatus sets the communication speed of the power supply apparatus according to the power supplied from the power supply apparatus to the electronic apparatus, the user does not need to perform the operation for setting the communication speed of the power supply apparatus, and the burden on user can be reduced.

Further, since the power supply apparatus sets the communication speed of the power supply apparatus according to the power supplied from the power supply apparatus to the electronic apparatus, unwanted radiation can be reduced, which is associated with wireless supply of power from the power supply apparatus to the electronic apparatus. The power supply apparatus reduces the generation of the unwanted radiation to supply an appropriate power to the electronic apparatus, allowing data to be transmitted to the electronic apparatus. The power supply apparatus sets the communication speed of the power supply apparatus according to the power supplied from the power supply apparatus to the electronic apparatus to enable the transmission of data such as the command and information to the electronic apparatus while supplying an appropriate power to the electronic apparatus according to specific regulations, for example.

The specific regulations refer to those related to a radio wave such as the Radio Act established in Japan and Federal Communications Commission (FCC) Part 15, for example.

Therefore, the power supply apparatus can transmit data to the electronic apparatus while supplying power to the electronic apparatus.

The power supply apparatus 100 according to the present invention is not limited to the power supply apparatus 100 described according to the first exemplary embodiment. The electronic apparatus 200 according to the present invention is not limited to the electronic apparatus 200 described according to the first exemplary embodiment either. For example, the power supply apparatus 100 and the electronic apparatus 200 according to the present invention may be realized by a system including a plurality of apparatuses.

The various types of processes and functions of the power supply apparatus 100 described according to the first exemplary embodiment can be realized by a computer program. Further, the various types of processes and functions of the electronic apparatus 200 described according to the first exemplary embodiment can also be realized by a computer program. In this case, the computer program according to the present invention can be executed by a computer (including a CPU) to realize the various types of functions described according to the first exemplary embodiment.

It is to be understood that the computer program according to the present invention may realize the various types of processes and functions described in the first exemplary embodiment by using an operating system (OS) operating on a computer.

The computer program according to the present invention is read from a computer readable recording medium and executed by the computer. A hard disk device, an optical disk, a compact-disk read only memory (CD-ROM), a compact disk readable (CD-R), a memory card, and a ROM may be used as the computer readable recording medium. Further, the computer program according to the present invention may be provided for the computer by an external apparatus via a communication interface and executed by the computer.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-085803 filed Apr. 7, 2011, which is hereby incorporated by reference herein in its entirety.

What is claimed is:

1. A power supply apparatus comprising:
a power supply unit that wirelessly supplies power to an electronic apparatus;
a communication unit that transmits predetermined data to the electronic apparatus; and
a control unit that controls, if power output from the power supply unit to the electronic apparatus is lower than a first predetermined value, the communication unit so that a predetermined speed for transmitting the predetermined data is higher than a second predetermined value,
wherein the control unit controls the communication unit so that the predetermined speed is less than or equal to the second predetermined value if power output from the power supply unit to the electronic apparatus is greater than or equal to the first predetermined value.

2. The power supply apparatus according to claim 1, wherein the control unit controls power supplied to the electronic apparatus based on an operation state of the electronic apparatus.

3. The power supply apparatus according to claim 1, wherein the control unit controls power supplied to the electronic apparatus based on remaining capacity of a battery connected to the electronic apparatus.

4. The power supply apparatus according to claim 1, wherein the predetermined data include data for controlling the electronic apparatus.

5. The power supply apparatus according to claim 1, wherein the predetermined data include data for detecting an operation state of the electronic apparatus.

6. The power supply apparatus according to claim 1, wherein the predetermined data include data used for detecting remaining capacity of a battery connected to the electronic apparatus.

7. The power supply apparatus according to claim 1, further comprising a unit that causes resonance between the electronic apparatus and the power supply apparatus.

8. The power supply apparatus according to claim 1, wherein the communication unit transmits the predetermined data to the electronic apparatus via near field communication (NFC).

9. A method comprising:
wirelessly supplying power to an electronic apparatus; and
transmitting predetermined data to the electronic apparatus,
wherein, if power output to the electronic apparatus is lower than a first predetermined value, a predetermined speed for transmitting the predetermined data is higher than a second predetermined value, and
wherein, if power output from to the electronic apparatus is greater than or equal to the first predetermined value, the predetermined speed for transmitting the predetermined data is less than or equal to the second predetermined value.

10. A computer readable storage medium storing a program executed by a computer to perform a method, the method comprising:
wirelessly supplying power to an electronic apparatus; and
transmitting predetermined data to the electronic apparatus,
wherein, if power output to the electronic apparatus is lower than a first predetermined value, a predetermined speed for transmitting the predetermined data is higher than a second predetermined value, and
wherein, if power output from to the electronic apparatus is greater than or equal to the first predetermined value, the predetermined speed for transmitting the predetermined data is less than or equal to the second predetermined value.

* * * * *